US011062825B2

(12) United States Patent
Kuroda et al.

(10) Patent No.: US 11,062,825 B2
(45) Date of Patent: Jul. 13, 2021

(54) INSULATED WIRE, COIL AND METHOD FOR MANUFACTURING THE COIL

(71) Applicant: Hitachi Metals, Ltd., Tokyo (JP)

(72) Inventors: Hiromitsu Kuroda, Tokyo (JP); Shohei Hata, Tokyo (JP); Takayuki Tsuji, Tokyo (JP); Keisuke Fujito, Tokyo (JP)

(73) Assignee: HITACHI METALS, LTD., Tokyo (JP)

( * ) Notice: Subject to any disclaimer, the term of this patent is extended or adjusted under 35 U.S.C. 154(b) by 175 days.

(21) Appl. No.: 16/144,191

(22) Filed: Sep. 27, 2018

(65) Prior Publication Data
US 2019/0272932 A1  Sep. 5, 2019

(30) Foreign Application Priority Data

Mar. 2, 2018 (JP) .............................. JP2018-037476
Jul. 17, 2018 (JP) .............................. JP2018-133805

(51) Int. Cl.
*H01B 7/30* (2006.01)
*H01B 3/30* (2006.01)
(Continued)

(52) U.S. Cl.
CPC ........... *H01B 13/145* (2013.01); *H01B 1/026* (2013.01); *H01B 1/08* (2013.01); *H01B 1/10* (2013.01);
(Continued)

(58) Field of Classification Search
CPC . H01B 3/306; H01B 1/10; H01B 1/08; H01B 1/026; C21D 8/0226;
(Continued)

(56) References Cited

U.S. PATENT DOCUMENTS 5,077,005 A * 12/1991 Kato .......................... C22C 9/00
420/469
2010/0263905 A1* 10/2010 Aoyama ................ H01B 1/026
174/107
(Continued)

FOREIGN PATENT DOCUMENTS

JP   2002-203438 A   7/2002
JP   2018-032596 A   3/2018

OTHER PUBLICATIONS

Office Action issued in corresponding Japanese Patent Application No. 2018-133805 dated Sep. 21, 2018.

*Primary Examiner* — Laura C Powers
*Assistant Examiner* — Larissa Rowe Emrich
(74) *Attorney, Agent, or Firm* — Roberts Calderon Safran & Cole P.C.

(57) ABSTRACT

An insulated wire includes a conductor including a copper material, and an insulation layer that is formed on an outer periphery of the conductor. A restoring temperature $T_B$ of the conductor is not more than 130° C. The restoring temperature $T_B$ is a temperature that is needed to restore a conductivity of the conductor after a coil processing to a conductivity of the conductor before the coil processing.

11 Claims, 1 Drawing Sheet

(51) Int. Cl.
    *H01B 1/10*     (2006.01)
    *H01B 1/08*     (2006.01)
    *H01F 5/06*     (2006.01)
    *H01B 1/02*     (2006.01)
    *H01B 13/14*     (2006.01)

(52) U.S. Cl.
    CPC ............... H01B 3/306 (2013.01); H01B 7/30 (2013.01); H01F 5/06 (2013.01); H01B 3/308 (2013.01)

(58) Field of Classification Search
    CPC ........ C21D 9/52–525; B21B 2003/005; B21B 2275/02–08; C22C 9/00–10; C22F 1/08
    See application file for complete search history.

(56) References Cited

U.S. PATENT DOCUMENTS

| | | | | |
|---|---|---|---|---|
| 2012/0048592 | A1* | 3/2012 | Kikuchi | H01B 3/306 |
| | | | | 174/110 SR |
| 2012/0097420 | A1* | 4/2012 | Aoyama | H01B 1/026 |
| | | | | 174/113 R |
| 2012/0097904 | A1* | 4/2012 | Kuroda | C22C 9/00 |
| | | | | 252/513 |
| 2012/0305286 | A1* | 12/2012 | Aoyama | H01B 1/026 |
| | | | | 174/113 R |
| 2014/0000932 | A1* | 1/2014 | Aoyama | C22F 1/08 |
| | | | | 174/105 R |
| 2014/0202730 | A1* | 7/2014 | Fujito | H01B 1/026 |
| | | | | 174/110 R |

\* cited by examiner

INSULATED WIRE, COIL AND METHOD FOR MANUFACTURING THE COIL

CROSS-REFERENCE TO RELATED APPLICATIONS

The present application is based on Japanese patent application Nos. 2018-037476 and 2018-133805 filed on Mar. 2, 2018 and Jul. 17, 2018, respectively, the entire contents of which are incorporated herein by reference.

FIELD OF INVENTION

The invention relates to an insulated wire, a coil using the insulated wire and a method for manufacturing the coil.

BACKGROUND ART

Coils are built in some electrical equipment such as a rotary electric machine (i.e., a motor) and a transformer. The coils are formed by using an insulated wire in which an insulation layer is formed on an outer periphery of a conductor. The insulation layer is formed on the outer periphery of the conductor, by using a method of coating and burning an insulating paint on the outer periphery of the conductor, the insulating paint being provided by dissolving a resin component in an organic solvent, a method of extruding the dissolved resin onto outer periphery of the conductor, or a combination of these two methods.

The insulated wire is processed into a coil by applying an edgewise bending or twisting processing thereto. In recent years, severer processing has been applied to the insulated wire due to demands for miniaturization of the coil (e.g., see Patent Document 1).

CITATION LIST

Patent Literature

Patent Document 1: JP 2002/203438 A

SUMMARY OF INVENTION

Technical Problem

When the coil is formed by using the insulated wire, the insulated wire is shaped into a coil (herein called coil processing) by applying the bending or twisting processing thereto. At this time, a processing distortion will occur in the conductor due to the bending and twisting processing. The processing distortion occurred in the conductor will cause a decrease in the conductivity of the conductor. Therefore, electric characteristic may deteriorate in the coil using the insulated wire after the coil processing. Accordingly, it is desirable to restore the decreased conductivity by applying a heat treatment to the coil.

The heat treatment is conducted such that the insulated wire is heated, e.g., at a temperature of not less than 200° C. Therefore, the insulation layer covering the conductor is required to have such a heat resistance that it is not deteriorated by the heat treatment to the conductor. As the resin to form the insulation layer, a resin such as PEEK resin (polyetheretherketone resin) which is excellent in the heat resistance may be used.

On the other hand, when the insulation layer is formed of a resin having a low heat resistance, the insulation layer may melt and deform by heat treatment after the coil processing.

Thus, in relation to the insulated wire used for the coil, the resin to form the insulation layer is limited to one having the high heat resistance in consideration of the heat treatment for restoring the conductivity. Therefore, in order to broaden the choice of resins to be used for the insulation layer, it is desirable to reduce the heating temperature needed to restore the deceased conductivity of the conductor.

It is an object of the invention to provide a technique for restoring the decreased conductivity of the conductor after the coil processing.

Solution to Problem

According to a first embodiment of the invention, an insulated wire comprises:

a conductor comprising a copper material; and
an insulation layer that is formed on an outer periphery of the conductor, wherein a restoring temperature $T_B$ of the conductor is not more than 130° C., and wherein the restoring temperature $T_B$ is a temperature that is needed to restore a conductivity of the conductor after a coil processing to a conductivity of the conductor before the coil processing.

According to a second embodiment of the invention, a coil comprises an insulated wire subjected to a coil processing, wherein the insulated wire comprises a conductor comprising a copper material and an insulation layer that is formed on an outer periphery of the conductor, wherein a restoring temperature $T_B$ of the conductor is not more than 130° C., and wherein the restoring temperature $T_B$ is a temperature that is needed to restore a conductivity of the conductor after the coil processing to a conductivity of the conductor before the coil processing.

According to a third embodiment of the invention, a method of manufacturing a coil comprises:

shaping an insulated wire into a coil, the insulated wire comprising a conductor comprising a copper material and an insulation layer that is formed on an outer periphery of the conductor;

heating the shaped insulated wire to restore a conductivity thereof, wherein the heating is conducted at a restoring temperature $T_B$ not more than 130° C. such that the conductivity after the shaping is restored to a conductivity before the shaping.

Effects of Invention

According to an embodiment of the invention, it is possible to restore the decreased conductivity of the conductor after the coil processing.

DESCRIPTION OF EMBODIMENTS

When the coil processing is conducted such that the insulated wire is wound around a core of a stator in a long shape and is bent or twisted after being shortened so as to be formed into a segment coil, a processing distortion occurs in the conductor due to the processing, so that the conductivity may be lowered. To reduce the processing distortion occurred in the conductor by the above-described processing or restore the conductivity lowered by the coil processing, the heat treatment is applied to the insulated wire after the coil processing. In general, since a heating temperature (herein also referred to as restoring temperature) necessary for restoring the conductivity is higher than a heating temperature (so-called semi-softening temperature) necessary for reducing the distortion occurred in the conductor, it was ever thought that it is necessary to heat the processed insulated wire at a temperature higher than the restoring temperature.

However, as a result of investigations by the inventors, they were found that the restoring temperature of a conductor can be lower than the semi-softening temperature thereof depending on the metal composition and manufacturing condition of the conductor, and that after this conductor is subjected to the coil processing, the decreased conductivity of the conductor due to the coil processing can be restored to a conductivity before the coil processing in a short time by heating the conductor at a temperature lower than the semi-softening temperature. In other words, it was found that by adjusting the metal composition and manufacturing condition of the conductor, the restoring temperature can be lower than the semi-softening temperature and the time taken to restore the conductivity can be shorter than the time taken upon heat treatment at a temperature higher than the semi-softening temperature. According to such a conductor whose restoring temperature is lower than the semi-softening temperature, it is possible to use not only a resin having the high heat resistance such as PEEK resin but also a resin having the low heat resistance for the insulation layer, since the heating temperature necessary for reducing the processing distortion and restoring the conductivity can be lowered. The present invention is made based on the such findings.

Embodiment

Figure 1:
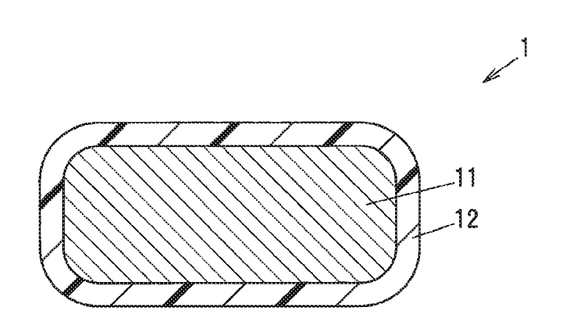
FIG. 1 is a cross sectional view showing an insulated wire in an embodiment of the present invention taken perpendicular to a longitudinal direction thereof.

An embodiment of the invention will be described in conjunction the drawings. FIG. 1 is a cross sectional view showing an insulated wire in an embodiment of the invention taken perpendicular to a longitudinal direction thereof. Hereinafter, the numerical range expressed using "-" includes the numerical values before and after "-" as the lower and upper limits.

Insulated Wire

As shown in FIG. 1, an insulated wire 1 comprises a conductor 11 and an insulation layer 12, and the insulated wire is formed into a coil shape by various processings such as edge-wise bending processing and twisting processing.

The conductor 11 is formed of a copper material. A semi-softening temperature ratio $T_B/T_A$ is less than 1.0, where the semi-softening temperature ratio $T_B/T_A$ is a ratio of a restoring temperature $T_B$ to a semi-softening temperature $T_A$. In other words, the conductor 11 is configured such that the restoring temperature $T_B$ is lower than the semi-softening temperature $T_A$ so as to restore the conductivity at a relatively low heating temperature. The restoring temperature $T_B$ of the conductor 11 is not more than 130° C.

Herein, a semi-softening temperature $T_A$ means a heating temperature (annealing temperature) corresponding to an intermediate tensile strength between a tensile strength before heating and a tensile strength after the heating and when completely annealed, in a heating softening curve showing the relationship between the heating temperature and the tensile strength relating to the copper material (the conductor 11) with the processing distortion accumulated therein. The semi-softening temperature $T_A$ is obtained as follows. First, the conductor 11 is drawn at a reduction ratio of 90%, and then the tensile strength is measured in a non-annealed state. Next, the conductor 11 is annealed at 400° C. for 1 hour etc., and then the tensile strength is measured in a completely recrystallized state. Then, the average tensile strength is calculated from the tensile strength of the annealed state and the tensile strength of the completely recrystallized state. Next, the conductor 11 is subjected to the heat treatment at temperatures of 150° C., 200° C. etc. for 1 hour, the tensile strength after the heat treatment at each temperature is measured, and a heat treatment temperature corresponding to the average tensile strength calculated above is obtained. This heat treatment temperature is defined as the semi-softening temperature $T_A$. Herein, an elongation rate, which is defined as a percentage of a permanent elongation after fracture with respect to an original evaluation point distance, is calculated by (L1−L0)/L0×100, where L0 is a length of an original test specimen before the tensile test and L1 is a length of the test specimen after the tensile test, in measuring the tensile strength.

That is, the semi-softening temperature $T_A$ means a heating temperature when the tensile strength of the conductor 11 with the processing distortion accumulated therein is reduced by half by heating. According to the semi-softening temperature $T_A$, it is possible to grasp an annealing temperature necessary for softening the tensile strength to half by removing the processing distortion accumulated in the conductor 11.

The restoring temperature $T_B$ means an annealing temperature (heating temperature) necessary for restoring the conductivity of the conductor 11 reduced by the occurrence of the processing distortion in the coil processing of the insulated wire 1 to the conductivity before the occurrence of the processing distortion by the annealing of 1 hour. In detail, the restoring temperature $T_B$ means an annealing temperature necessary for restoring the conductivity (which decreases when the drawing is done by 30% as a simulation of the coil processing to the insulated wire 1) of the conductor 11 by the annealing of 1 hour, to such a conductivity that the amount of change relative to the conductivity before drawing process (e.g., 100% IACS) is within 0.5% IACS (e.g., not less than 99.5% IACS and not more than 100.5%).

The semi-softening temperature ratio $T_B/T_A$ is not specifically limited as long as it is less than 1.0, but from the viewpoint of shortening the heating time, it is preferably not more than 0.9, more preferably not more than 0.8. The lower limit of the semi-softening temperature ratio is approximately 0.6.

From the viewpoint of lowering the heating temperature The insulated wire after the coil processing, the lower the semi-softening temperature $T_A$ is, the better. For example, it is preferably 125° C.-138° C.

The restoring temperature $T_B$ of the conductor 11 is not more than 130° C. From the viewpoint of shortening the heating time necessary for restoring the conductivity of the conductor 11, the restoring temperature $T_B$ is to be lower than the semi-softening temperature $T_A$, preferably 75° C.-124° C.

The copper material composing the conductor 11 preferably has a chemical composition that is of a titanium concentration of 4-55 mass ppm, a sulfur concentration of 2-12 mass ppm, an oxygen concentration of 2-30 mass ppm and the balance being copper and inevitable impurities, wherein the ratio of the titanium concentration to the oxygen concentration is 2.0-4.0, from viewpoint of adjusting the semi-softening temperature ratio $T_B/T_A$ to less than 1.0 by making the restoring temperature $T_B$ lower than the semi-softening temperature $T_A$. Due to such a composition, the semi-softening temperature ratio $T_B/T_A$ can be adjusted to less than 1.0, the semi-softening temperature $T_A$ can be lowered in the range of 125° C.-138° C., and the heating temperature after the coil processing can be significantly lowered.

As a result of investigations by the inventors, it was found that, in the copper material composing the conductor 11, by lowering the concentrations of sulfur and oxygen and adding a small amount of titanium so as to adjust the ratio of the titanium concentration to the oxygen concentration within a predetermined range, the semi-softening temperature ratio $T_B/T_A$ can be easily made to be less than 1.0. The reason for this is presumed that when the copper material composing the conductor 11 is produced by casting a molten metal, the purity of the parent phase (copper) can be improved by precipitates such as a titanium sulfide and α-type titanium (unavoidable impurities) formed among titanium, sulfur, and inevitable impurities.

From the viewpoint of increasing the conductivity of the conductor 11, in the copper material, the titanium concentration is preferably not more than 37 mass ppm, more preferably not more than 25 mass ppm. In the present embodiment, oxygen is contained in the conductor 11 from the viewpoint of lowering the semi-softening temperature $T_A$ of the conductor 11. However, from the viewpoint of further lowering the semi-softening temperature $T_A$, the restoring temperature $T_B$, and the semi-softening temperature ratio $T_B/T_A$, the oxygen concentration is preferably 5-15 mass ppm. It is more preferable that the ratio of the titanium concentration to the oxygen concentration is 2.0-3.0. By such a configuration, it is possible to lower the semi-softening temperature ratio and to improve the conductivity of the conductor 11 and the elongation percentage of the conductor 11 obtained by heating after the coil processing.

In the conductor 11, titanium compounds such as titanium sulfide and α-type titanium are finely dispersed and distributed as precipitates. The size (particle diameter) of these precipitates is, for example, preferably 20 nm-300 nm from the viewpoint of finely dispersing them in the conductor 11.

As will be described later, sulfur and oxygen are impurities derived from a copper raw material, and titanium is an element added to the molten metal when casting the conductor 11.

The cross-sectional shape of the conductor 11 is not specifically limited to, e.g., a circular shape or a rectangular shape, but from the viewpoint of improving the space factor when the insulated wire 1 is processed into a coil, a rectangular shape as shown in FIG. 1 is preferable. The thickness and width of the conductor 11 may be appropriately changed according to the use of the insulated wire 1, and, for example, the thickness may be 0.5 mm-1.0 mm and the width may be 5 mm-25 mm.

On the outer periphery of the conductor 11, the insulation layer 12 is provided. As described above, in the present embodiment, the conductivity of the conductor 11 can be restored by heating at a low temperature of not more than 130° C. and, therefore, the resin composing the insulation layer 12 is not limited to a resin such as PEEK resin having the high heat resistance, and a resin having the lower heat resistance than the PEEK resin can be used. For example, at least one thermosetting resin such as a polyimide resin, a polyamide-imide resin and a polyester-imide resin can be used. Meanwhile, the insulation layer 12 is formed by applying an insulating paint containing the thermosetting resin to the outer periphery of the conductor 11 and baking it. Also, the thickness of the insulation layer 12 may be appropriately changed according to the electrical characteristics required for the coil. The insulation layer 12 may be made of a polyimide resin, a polyamide-imide resin or a polyester-imide resin having a low imide group concentration (e.g., an imide group concentration of less than 36%) and a high partial discharge inception voltage (e.g., a peak voltage of not less than 1000 Vp). Also, the insulation layer 12 may have pores so as to lower the permittivity. Also, the insulation layer 12 may be formed of a resin including inorganic fine particles such as silica and alumina so as to a high resistance (partial discharge resistance) to partial discharge. Further, the resin constituting the insulation layer 12 may include a resin composed of the above-mentioned thermoplastic resin and a thermoplastic resin such as PEEK (polyetheretherketone) resin and PPS (polyphenylene sulfide) resin.

Method for Manufacturing the Insulated Wire

A method of manufacturing the above-described insulated wire 1 will be described below First, the conductor 11 having a semi-softening temperature ratio $T_B/T_A$ of less than 1.0 is prepared.

Specifically, a molten metal is prepared by mixing the copper raw material, the titanium raw material and, if necessary, other metallic raw materials and melting by heating. At this time, each raw material is selected and mixed so that the chemical composition of the molten metal is of a titanium concentration of 4-55 mass ppm, a sulfur concentration of 2-12 mass ppm, and an oxygen concentration of 2-30 mass ppm, the balance being a copper and inevitable impurities, and that the ratio of the Ti concentration to the oxygen concentration is 2.0-4.0.

The reason for adding titanium is to react titanium with sulfur or oxygen in the molten metal. Titanium reacts with sulfur or oxygen to form titanium compounds such as titanium sulfide (TiS) and α-type titanium (Ti-α) (α is inevitable impurities) as a precipitate. Examples of a type titanium include titanium monoxide (TiO), titanium oxide ($TiO_2$), titanium sulfide (TiS), Ti—O—S particles. By the formation of precipitates, oxygen and sulfur contained in the parent phase (copper) can be reduced so as to increase the purity. The reason why the ratio of the Ti concentration to the oxygen concentration is 2.0-4.0 is that titanium is sufficiently reacted with oxygen by adding an excess amount of titanium to oxygen and that titanium is solid-solved so as to promote the precipitation of titanium and sulfur in a hot rolling process to be described later.

The molten metal is preferably placed in a reducing gas atmosphere such as carbon monoxide to suppress contamination of oxygen from outside. This facilitates control of the oxygen concentration within a predetermined range.

Then, the molten metal is cast to form a cast material. In the cast material, titanium and sulfur or oxygen form precipitates, while titanium and sulfur which have not been reacted are solid-solved in the parent phase.

Then, the cast material is subjected to hot rolling processing and then a surface of a rolled material obtained thereby is subjected to oxidation-reduction reaction to clean it, so that a roughly drawn wire can be formed. For example, the hot rolling processing may be conducted such that the cross-sectional area of the cast material is gradually reduced by hot rolling the cast material plural times by using a rolling mill having plural mill rolls. The temperature (hot rolling temperature) of the hot rolling processing may be gradually lowered from the upstream side mill roll to the downstream side mill roll in the plural mill rolls. For example, the hot rolling processing may be constructed by a rough rolling on the upstream side and a finish rolling on the downstream side, and conducted such that the hot rolling processing temperature is gradually lowered in the range of 500° C.-880° C. and the hot rolling processing is made stepwise in plural times. In the present embodiment, the rolled material is thus obtained by the hot rolling processing of the cast material. In particular, in the present embodiment, it is preferable that the hot rolling processing is conducted to the above-mentioned cast material subjected to the stepwise hot rolling at a hot rolling temperature of 500° C.-550° C. in the final mill roll. Also, in the present embodiment, it is preferable that when the hot rolling processing is conducted by using plural mill rolls, the time (hot rolling time) required from the hot rolling processing at the first mill roll to the hot rolling processing at the final mill roll is not less than 10 seconds. By conducting the hot rolling processing under such conditions, it is possible to precipitate titanium and sulfur, which are not reacted in the molten metal and solid-solved in the copper phase. As a result, the purity of the parent phase in the obtained roughly drawn wire can be further improved, the restoring temperature $T_B$ of the conductor 11 obtained by processing the roughly drawn wire can be lowered to not more than 130° C., and the semi-softening temperature ratio $T_B/T_A$ of the conductor 11 can be adjusted to be less than 1.0. In the cast material, by setting titanium, sulfur and oxygen to be the above composition and by adjusting the titanium concentration to be a predetermined ratio relative to the oxygen concentration, the elongation property of the cast material can be enhanced, so that the rolling processing can be performed at the lowered hot rolling temperature. The outer diameter of the roughly drawn wire is not particularly limited, but is preferably, e.g., 6 mm-20 mm.

Then, a conductor 11 of a wire material having a rectangular cross section is formed by conducting a processing such as cold wire drawing and heat treatment to the roughly drawn wire. The thickness of the conductor 11 may be, e.g., 0.5 mm-1.0 mm, and the width of the conductor 11 may be 5 mm-25 mm.

Next, the insulation layer 12 is formed by applying and baking (curing the thermosetting resin) an insulating paint containing, e.g., the above-described thermosetting resin on the outer periphery of the conductor 11. For example, the application and baking of the insulating paint may be repeated until the insulation layer 12 has a desired thickness. In baking the insulating paint, e.g., only the solvent contained in the insulating paint is evaporated by irradiating the conductor 11 coated with the insulating paint with near infrared rays, and then the insulation layer 12 may be formed by curing the thermosetting resin contained in the insulating paint.

The insulated wire 1 in the present embodiment is obtained through the above-described process, wherein the insulated wire 1 (enameled wire) has the insulation layer 12 provided on the outer periphery of the conductor 11 formed of a copper material and has a restoring temperature $T_B$ of the conductor 11 of not more than 130° C.

Coil and Method for Manufacturing the Coil

The coil using the above-described insulated wire 1 and the manufacturing method of the coil will be described below.

First, the above insulated wire 1 is wound to be shaped into a coil. For example, the insulated wire 1 is shaped into a coil by edgewise bending processing of the insulated wire 1 in the width direction (left-right direction in the drawing in FIG. 1). A coil is formed by connecting plural insulated wires 1 shaped into coil, respectively. When the insulated wire 1 is shaped into coil, the processing distortion accumulates on the conductor 11 of the insulated wire 1, and the conductivity of the conductor 11 decreases. Besides being wound as described above and shaped into coil, the insulated wire 1 may be shaped into a coil by being cut into an arbitrary length and formed into a segment coil by bending or twisting to the short insulated wire 1 after cutting. In this case, a coil is formed by connecting the terminal portions of the plural segment coils by TIG welding, etc.

Then, in order to restore the conductivity of the conductor 11 and reduce the processing distortion accumulated in the conductor 11, the insulated wire 1 shaped into a coil is heated. In the present embodiment, since the restoring temperature $T_B$ of the conductor 11 is not more than 130° C. and the semi-softening temperature ratio $T_B/T_A$ is less than 1.0, it is possible to reduce the processing distortion while restoring the conductivity, by heating the insulated wire 1 at a temperature lower than the semi-softening temperature $T_A$ as well as shortening the heating time. The heating time of the insulated wire 1 may be appropriately set so that the conductivity after heating is restored to be in the range of 0.5% IACS relative to the conductivity before the coil processing. For example, the heating time is preferably not less than 0.5 hour (30 minutes) and not more than 1 hour (60 minutes). The heating of the insulated wire 1 shaped into coil may be before or after the connection of the plural insulated wires 1. For example, when heating the insulated wire 1 shaped into coil, it is possible to utilize the heat during the varnish treatment to the surface of the coil after forming the coil by connecting each of the plural insulated wires 1.

Thus, the coil of the present embodiment can be obtained.

In the present embodiment, the insulated wire 1 as a rectangular wire having the rectangular conductor 11 has been described. However, the present invention is not limited thereto, and the insulated wire 1 as a round wire having a round conductor 11 can be provided. Also, the processing of the insulated wire 1 is not limited to the coil processing, and the other processing such as bending processing, twisting processing, and crushing processing may be performed. Even when the other processing is performed, the conductivity can be restored by heating the insulated wire 1 at the restoring temperature $T_B$.

Effects of the Embodiment

In the present embodiment, one or more effects described below are obtained.

The insulated wire 1 of the present embodiment is of the conductor 11 having a restoring temperature $T_B$ of not more than 130° C. and the semi-softening temperature ratio $T_B/T_A$ of less than 1.0. According to such a conductor 11, since the restoring temperature $T_B$ is lower than the semi-softening temperature $T_A$, by heating the insulated wire 1 at the restoring temperature $T_B$ lower than the semi-softening temperature $T_A$ after the coil processing, it is possible to restore the conductivity lowered by the coil processing to the conductivity before the coil processing. That is, without the need to heat up to the semi-softening temperature $T_A$, the conductivity can be restored by heating at a low temperature.

Also, it is preferable that the semi-softening temperature $T_A$ of the conductor 11 is 125° C.-138° C. and the restoring temperature $T_B$ of the conductor 11 is 75° C.-124° C. According to such a conductor 11, it is possible to lower the temperature at which the insulated wire 1 is heated. Therefore, it is possible to prevent the type of resin forming the insulation layer from being restricted to a resin having high heat resistance, and it is possible to widen the range of selection of the resin to be applied to the insulation layer. Moreover, in the conductor 11, it is possible to shorten the time required for restoring the conductivity while lowering the restoring temperature $T_B$. Therefore, when heating the insulated wire 1 to restore the conductivity of the conductor 11 after the coil processing, the insulation layer 12 is less likely to deteriorate by the heating.

It is preferable that the copper raw material forming the conductor 11 has a chemical composition that is of a titanium concentration of 4-55 mass ppm, a sulfur concentration of 2-12 mass ppm, an oxygen concentration of 2-30 mass ppm, the balance being Cu and inevitable impurities, and the ratio of the titanium concentration to the oxygen concentration is 2.0-4.0.

Also, the copper material forming the conductor 11 contains a titanium compound as a precipitate, and the particle diameter of the titanium compound is preferably 20 nm-300 nm. By finely dispersing the titanium compound having a small particle diameter in the conductor 11, the metal crystal structure constituting the conductor 11 can be finely maintained when the conductor 11 is heated. Thus, the elongation percentage of the conductor 11 can be increased.

Further, in the present embodiment, it is preferable that the temperature when conducting the hot rolling processing with the final mill roll is 500° C.-550° C. when the roughly drawn wire is manufactured by conducting the plural hot rolling processings of the cast material. In performing the hot rolling processing with the plural mill rolls, it is preferable that the time (hot rolling time) required from the hot rolling processing by the first mill roll to the hot rolling processing by the final mill roll is not less than 10 seconds. By conducting the hot rolling processing under such conditions, it is possible to further precipitate titanium and sulfur that are solid-solved in the copper phase of the cast material, to improve the purity of copper in the conductor 11, so that the restoring temperature $T_B$ of the conductor 11 can be lowered to be not more than 130° C. and the semi-softening temperature ratio $T_B/T_A$ of the conductor 11 can be adjusted to be less than 1.0.

The coil of the present embodiment is formed by the coil processing of the insulated wire 1, wherein the insulated wire 1 is of the conductor 11 having a restoring temperature $T_B$ of not more than 130° C. and a semi-softening temperature ratio $T_B/T_A$ of less than 1.0. Since the semi-softening temperature ratio $T_B/T_A$ of the conductor 11 is less than 1.0 and the heating temperature of the insulated wire 1 is not more than 130° C., which is lower than the semi-softening temperature $T_A$, thermosetting resins such as polyimide resin, polyamide-imide resin and polyester-imide resin can be used for the insulation layer 12. That is, in the present embodiment, when selecting a resin to be used for the coil insulated wire, it is possible to select not only a resin having high heat resistance but also a resin having low heat resistance. Also, by heating the insulated wire 1 to restore the conductivity of the conductor 11 to the same level as the conductivity before the processing, it is possible to maintain the high electric characteristics of the coil.

EXAMPLES

Although the invention will be described in more detail based on Examples below, the invention is not limited to these Examples. In the below Examples, conductors are manufactured so as to measure semi-softening temperature and restoring temperature thereof.

Example 1

First, a conductor formed of a copper material is produced. Specifically, a predetermined copper raw material and a predetermined titanium raw material are prepared, mixed and melted by heating to prepare the molten metal which has the chemical composition, as shown in Table 1, that is of a titanium concentration of 24 mass ppm, a sulfur concentration of 4 mass ppm, an oxygen concentration of 12 mass ppm, the balance being copper and inevitable impurities, and the ratio of titanium concentration to oxygen concentration is 2.0. Then, the molten metal is cast so as to form a cast material, the cast material is subjected to the hot rolling processing, and the surface of the rolled material after the hot rolling processing is further cleaned by oxidation-reduction reaction, so that a roughly drawn wire with an outer diameter of 8 mm is formed. In the hot rolling processing, the temperature at the first mill roll is set to be 850° C., the temperature at the final mill roll is set to be 500° C., and the time (hot rolling time) required from the hot rolling processing by the first mill roll to the hot rolling processing by the final mill roll is set to be 15 seconds. Next, a rectangular conductor having a width of 6.5 mm and a thickness of 0.8 mm is formed by processing the roughly drawn wire by the cold wire drawing and cold rolling processing and, if necessary, heat treatment. When the cross section of the conductor is observed with an electron microscope, it is found that the titanium compound as a precipitate is finely dispersed, and the particle diameter of the titanium compound was about 100 nm.

Then, by applying and baking an insulating paint containing a polyimide resin on the outer periphery of the conductor to form an insulation layer, the insulated wire of Example 1 is produced.

TABLE 1

|  |  |  | Example | | | | | Comparative Example | | | | |
| --- | --- | --- | --- | --- | --- | --- | --- | --- | --- | --- | --- | --- |
|  |  |  | 1 | 2 | 3 | 4 | 5 | 1 | 2 | 3 | 4 | 5 |
| Conductor | Copper material | Oxygen concentration [msss ppm] | 12 | 13 | 10 | 12 | 12 | 12 | 13 | 12 | 350 | 5 |
|  |  | Sulfur concentration [msss ppm] | 4 | 4 | 5 | 4 | 3 | 4 | 4 | 4 | 4 | 3 |
|  |  | Titanium concentration [msss ppm] | 24 | 26 | 30 | 24 | 24 | 18 | 20 | 24 | — | — |
|  |  | Ratio of titanium concentration to | 2.0 | 2.0 | 3.0 | 2.0 | 2.0 | 1.5 | 1.5 | 2.0 | — | — |

TABLE 1-continued

|  |  | Example | | | | | Comparative Example | | | | |
| --- | --- | --- | --- | --- | --- | --- | --- | --- | --- | --- | --- |
|  |  | 1 | 2 | 3 | 4 | 5 | 1 | 2 | 3 | 4 | 5 |
| Rolling conditions | oxygen concentration | | | | | | | | | | |
|  | Final hot rolling temperature [° C.] | 500 | 550 | 550 | 500 | 550 | 550 | 550 | 500 | 550 | — |
|  | Hot rolling time [s] | 15 | 15 | 15 | 10 | 10 | 15 | 7 | 7 | 15 | — |
| Evaluation | Semi-softening temperature [° C.] | 125 | 133 | 128 | 130 | 138 | 142 | 146 | 144 | 160 | 220 |
|  | Restoring temerature [° C.] | 88 | 120 | 102 | 111 | 130 | 185 | 204 | 196 | 240 | 304 |
|  | Semi-softening temperature ratio $T_B/T_A$ | 0.70 | 0.90 | 0.80 | 0.85 | 0.94 | 1.30 | 1.40 | 1.36 | 1.5 | 1.38 |

Examples 2-5 and Comparative Examples 1-5

In Examples 2-5 and Comparative Examples 1-4, an insulated wire is produced in the same manner as Example 1 except that the composition of the copper material and the conditions of the rolling process are appropriately changed as shown in Table 1. In Comparative Example 5, an insulated wire is produced in the same manner as Example 1 except that the method of making the cast material is changed from hot rolling processing to hot extrusion. In Comparative Example 5, the rolling conditions are not shown in Table 1 because the hot rolling processing is not performed.

Evaluation

For each insulated wire, the semi-softening temperature $T_A$ and restoring temperature $T_B$ of the conductor are measured by the following method.

The semi-softening temperature $T_A$ is defined as a heat treatment temperature at which the tensile strength decreases to ½ (half) of the tensile strength of the hard copper wire before heat treatment and the tensile strength completely annealed at 400° C., wherein the hot rolled φ8 mm roughly drawn wire is subjected to cold processing to make a hard copper wire of φ2.6 mm and the heat treating in a salt bath at 100° C.-400° C. for 1 hour, and then the tensile strength thereof is measured at room temperature.

The restoring temperature $T_B$ is determined as follows. First, the conductivity of the conductor is measured before and after elongation processing of 30% to the insulated wire. At this time, due to the processing distortion by the 30% elongation, the conductivity decreases. Where the insulated wire subjected to the 30% elongation processing is heated for one hour, the restoring temperature $T_B$ is defined as the temperature necessary for restoring the conductivity of the conductor after the heating within 0.5% IACS as the change amount to the conductivity of the conductor before the elongation processing.

Evaluation Results

As a result of measuring the semi-softening temperature $T_A$ and the restoring temperature $T_B$ of the insulated wire of Example 1, it is confirmed that the semi-softening temperature $T_A$ is 125° C., the restoring temperature $T_B$ was 88° C., and the semi-softening temperature ratio $T_B/T_A$ was 0.70 which is less than 1.0. That is, in the insulated wire of Example 1, it is confirmed that the restoring temperature $T_B$ is not more than 130° C., and the conductivity of the conductor can be restored to the level before the processing by heating at a temperature lower than the semi-softening temperature $T_A$. In Examples 2-5, it is also confirmed that, as in Example 1, the conductivity can be restored by heating at a temperature of not more than 130° C., which is lower than the semi-softening temperature $T_A$.

Also, when comparing Example 1 with Example 2, or comparing Example 4 with Example 5, it is confirmed that according as the final hot rolling temperature lowers, the semi-softening temperature $T_A$ and the restoring temperature $T_B$ and the semi-softening temperature ratio $T_B/T_A$ can be reduced. Furthermore, when comparing Example 1 with Example 4 or comparing Example 2 with Example 5, it is confirmed that according as the hot rolling time increases, the half softening temperature $T_A$ and the restoring temperature $T_B$ are, and the semi-softening temperature ratio $T_B/T_A$ can be reduced. This is presumably because in the hot rolling, titanium and sulfur solid-solved in the roughly drawn wire can be easily precipitated by rolling at a relatively low temperature for a relatively long time, so that the purity of the parent phase can be further increased.

On the other hand, in the insulated wires of Comparative Examples 1 and 2, it is confirmed that the restoring temperature $T_B$ is higher than 130° C. and higher than the semi-softening temperature $T_A$, and the semi-softening temperature ratio $T_B/T_A$ is not less than 1.0. In other words, it is confirmed that the insulated wires of Comparative Examples 1 and 2 need to be heated at a temperature higher than the semi-softening temperature $T_A$ (higher than 130° C.) to restore the conductivity after the coil processing. This is presumably because since the ratio of the titanium concentration to the oxygen concentration in the conductor is less than 2, sulfur cannot be sufficiently precipitated by titanium, so that the purity of the parent phase cannot be increased.

Also, the insulated electric wire of Comparative Example 3 has the same chemical composition as in Example 1. However, it is confirmed that due to the hot rolling time shortened to 7 seconds, titanium and sulfur are insufficiently precipitated, and the restoring temperature $T_B$ is 196° C., and the semi-softening temperature ratio $T_B/T_A$ is not less than 1.0.

Also, in the insulated wire of Comparative Examples 4 and 5, it is confirmed that the semi-softening temperature $T_A$ and the restoring temperature $T_B$ thereof are higher than those of Comparative Examples 1-3, and the semi-softening temperature ratio $T_B/T_A$ thereof is not less than 1.0. This is presumably because due to not adding titanium to the conductor, sulfur is insufficiently precipitated, so that the purity of the matrix phase cannot be increased.

As a result, it is found that the decreased conductivity of the conductor of the insulated wire after the coil processing can be restored at a low temperature by using for the insulated wire a conductor having a restoring temperature $T_B$ of not more than 130° C. and/or a semi-softening temperature ratio $T_B/T_A$ of less than 1.0.

Preferred Embodiments of Invention

In summary, preferred embodiments of the invention will be described below.

[1] An embodiment of the invention provides an insulated wire, comprising:
a conductor comprising a copper material; and
an insulation layer that is formed on an outer periphery of the conductor,
wherein a restoring temperature $T_B$ of the conductor is not more than 130° C., and
wherein the restoring temperature $T_B$ is a temperature that is needed to restore a conductivity of the conductor after a coil processing to a conductivity of the conductor before the coil processing.

[2] The insulated wire defined by [1] may be such that the restoring temperature $T_B$ is lower than a semi-softening temperature $T_A$ of the conductor.

[3] The insulated wire defined by [2] may be such that a semi-softening temperature ratio $T_B/T_A$ is less than 1.0, the semi-softening temperature ratio $T_B/T_A$ is a ratio of the temperature $T_B$ to the semi-softening temperature $T_A$.

[4] The insulated wire defined by [2] or [3] may be such that the semi-softening temperature $T_A$ of the conductor is not less than 125° C. and not more than 138° C.

[5] The insulated wire defined by any one of [1] to [3] may be such that the restoring temperature $T_B$ is not less than 75° C. and not more than 124° C.

[6] The insulated wire defined by any one of [1] to [5] may be such that the copper material comprises a chemical composition comprising a titanium concentration of not less than 4 mass ppm and not more than 55 mass ppm, a sulfur concentration of not less than 2 mass ppm and not more than 12 mass ppm, an oxygen concentration of not less than 2 mass ppm and not more than 30 mass ppm, and a balance being copper and inevitable impurities, wherein a ratio of the titanium concentration to the oxygen concentration is not less than 2.0 and not more than 4.0.

[7] The insulated wire defined by any one of [1] to [6] may be such that the copper material forming the conductor comprises a titanium compound, wherein a particle size of the titanium compound is 20 nm-300 nm.

[8] The insulated wire defined by any one of [1] to [7] may be such that the insulation layer comprises a thermosetting resin comprising at least one of a polyimide resin, a polyamide-imide resin and a polyester-imide resin.

[9] Another embodiment of the invention provides a coil comprising an insulated wire subjected to a coil processing;
wherein the insulated wire comprises a conductor comprising a copper material and an insulation layer that is formed on an outer periphery of the conductor,
wherein a restoring temperature $T_B$ of the conductor is not more than 130° C., and
wherein the restoring temperature $T_B$ is a temperature that is needed to restore a conductivity of the conductor after the coil processing to a conductivity before the coil processing.

[10] Yet another embodiment of the invention provides a method of manufacturing a coil comprising:
shaping an insulated wire into a coil, the insulated wire comprising a conductor comprising a copper material and an insulation layer that is formed on an outer periphery of the conductor;
heating the shaped insulated wire to restore a conductivity thereof,
wherein the heating is conducted at a restoring temperature $T_B$ not more than 130° C. such that the conductivity after the shaping is restored to a conductivity before the shaping.

[11] The method of manufacturing a coil defined by [10] may be such that the copper material comprises a chemical composition comprising a titanium concentration of not less than 4 mass ppm and not more than 55 mass ppm, a sulfur concentration of not less than 2 mass ppm and not more than 12 mass ppm, an oxygen concentration of not less than 2 mass ppm and not more than 30 mass ppm, and a balance being copper and inevitable impurities, wherein a ratio of the titanium concentration to the oxygen concentration is not less than 2.0 and not more than 4.0.

The invention claimed is:

1. An insulated wire, comprising:
a conductor comprising a copper material comprising a chemical composition comprising a titanium concentration of not less than 24 mass ppm and not more than 30 mass ppm, a sulfur concentration of not less than 3 mass ppm and not more than 5 mass ppm, an oxygen concentration of not less than 10 mass ppm and not more than 13 mass ppm, and a balance being copper and inevitable impurities and subjected to a hot rolling time of at least about 10 seconds at a hot rolling temperature by a final mill roll of not less than 500° C. and not more than 550° C.; and
an insulation layer formed on an outer periphery of the conductor,
wherein a restoring temperature $T_B$ of the conductor is not less than 75° C. and not more than 124° C., and
wherein the restoring temperature $T_B$ is a temperature that is needed to restore a conductivity of the conductor after a coil processing to a conductivity of the conductor before coil processing.

2. The insulated wire according to claim 1, wherein the restoring temperature $T_B$ is lower than a semi-softening temperature $T_A$ of the conductor.

3. The insulated wire according to claim 2, wherein the semi-softening temperature $T_A$ of the conductor is not less than 125° C. and not more than 138° C.

4. The insulated wire according to claim 1,
wherein a ratio of the titanium concentration to the oxygen concentration is not less than 2.0 and not more than 4.0.

5. The insulated wire according to claim 1, wherein insulation layer comprises a thermosetting resin comprising at least one of a polyimide resin, a polyamide-imide resin and a polyester-imide resin.

6. The insulated wire according to claim 2,
wherein a ratio of the titanium concentration to the oxygen concentration is not less than 2.0 and not more than 4.0.

7. The insulated wire according to claim 3,
wherein a ratio of the titanium concentration to the oxygen concentration is not less than 2.0 and not more than 4.0.

8. The insulated wire according to claim 2, wherein the insulation layer comprises a thermosetting resin comprising at least one of a polyimide resin, a polyamide-imide resin and a polyester-imide resin.

9. The insulated wire according to claim 3, wherein the insulation layer comprises a thermosetting resin comprising at least one of a polyimide resin, a polyamide-imide resin and a polyester-imide resin.

10. The insulated wire according to claim 1, wherein the restoring temperature $T_B$ of the conductor is not less than 88° C. and not more than 120° C.

11. The insulated wire according to claim 1, wherein the restoring temperature $T_B$ is defined as the temperature necessary for restoring the conductivity of the conductor of the wire to within 0.5% IACS before the wire is subjected to a 30% elongation processing and heated for one hour.

* * * * *